Figure 1:
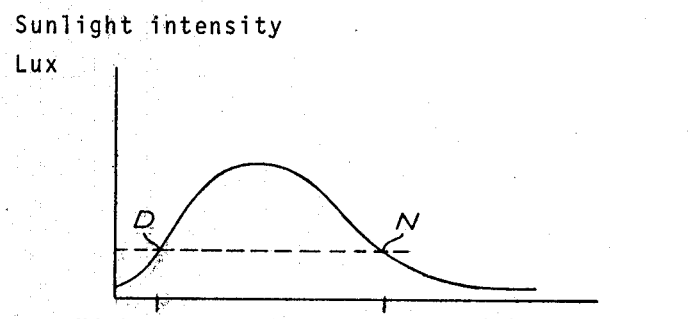

United States Patent [19]

Nissmo et al.

[11] 4,339,074
[45] Jul. 13, 1982

[54] METHOD AND APPARATUS FOR CONTROLLING THE TEMPERATURE IN GREENHOUSES

[76] Inventors: Jim A. Nissmo, Repslagarevägen 8; Jan A. Sundin, Travvägen 14, both of S-245 00 Staffanstorp; Lars B. Sjöström, Södra Parkgatan 39, S-214 22 Malmö, all of Sweden

[21] Appl. No.: 195,419
[22] PCT Filed: Oct. 10, 1979
[86] PCT No.: PCT/SE79/00203
  § 371 Date: Jun. 11, 1980
  § 102(e) Date: Jun. 10, 1980
[87] PCT Pub. No.: WO80/00648
  PCT Pub. Date: Apr. 17, 1980

[30] Foreign Application Priority Data

Oct. 11, 1978 [SE] Sweden .............................. 7810611

[51] Int. Cl.³ .................. A01G 9/00; G05D 23/00
[52] U.S. Cl. ........................................ 236/47; 47/17
[58] Field of Search ............. 236/47, 46 R; 165/11, 165/12; 47/17

[56] References Cited

U.S. PATENT DOCUMENTS 3,905,153  9/1975  Enter ........................................ 47/17

FOREIGN PATENT DOCUMENTS 883346  11/1961  United Kingdom

Primary Examiner—William E. Wayner
Attorney, Agent, or Firm—Finnegan, Henderson, Farabow, Garrett & Dunner

[57] ABSTRACT

Method and apparatus for controlling the temperature in greenhouses, the nominal value of the temperature being adjusted between a higher daytime temperature and a lower night temperature. In order that the plants in the greenhouse shall not be exposed to a shocklike reduction of the total energy supply to the plants if a considerable sunlight energy quantity has been supplied to the plants in the daytime, the nominal value of the night temperature is controlled in dependence of the sunlight energy quantity received by the plants, in such a manner that the night temperature is adjusted to a higher value at a higher sunlight energy quantity.

4 Claims, 5 Drawing Figures

METHOD AND APPARATUS FOR CONTROLLING THE TEMPERATURE IN GREENHOUSES

The invention relates to a method and an apparatus for controlling the temperature in greenhouses, the nominal value of the temperature being adjusted between a higher daytime temperature and a lower night temperature.

Generally, such adjustment between different temperatures is controlled by a timer which at suitable times in 24 hours at the change from day to night and from night to day, respectively, switches the regulator for the heating unit of the greenhouse from a preset daytime temperature to a preset night temperature, and vice versa. In this connection, it is of course of interest from an economical point of view that there is not maintained in the night a temperature in the greenhouse, which is higher than that necessary in order that the plants will get on therewith and the growth, flowering or fructification thereof shall not be stunted.

However, it has been found that the night temperature which is ideal to the plants during a major part of the year, during another part of the year when the conditions in the daytime are most favourable to the plants, in a remarkably high degree stunts the plants. It has turned out that this is due to the fact that in the daytime a considerable amount of sunlight energy has been supplied to the plants; the change-over from daytime conditions to night conditions in the greenhouse as a consequence thereof represents a shocklike reduction of the total energy supply to the plants if the control is strictly tied to the maintenance of a predetermined nominal value of the temperature in the greenhouse in the daytime and a predetermined lower nominal value of this temperature in the night if the energy-economical aspect only is taken into consideration as far as a suitable difference between these two nominal values is concerned.

Bearing the aforementioned in mind and in order to eliminate the shock effect for which the plants-as has been found-may be exposed during sunny and warm days, and to obtain optimum economy with regard to the energy consumption as well as the result of the growth a method and an apparatus for working said method are proposed according to the invention, having the characteristics appearing from claims 1 and 4, respectively.

Figure 2:
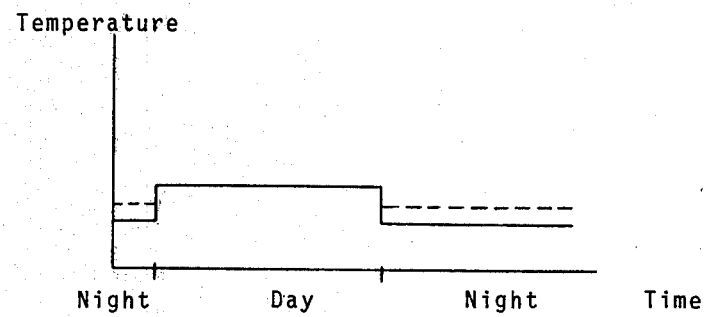
Figure 4:
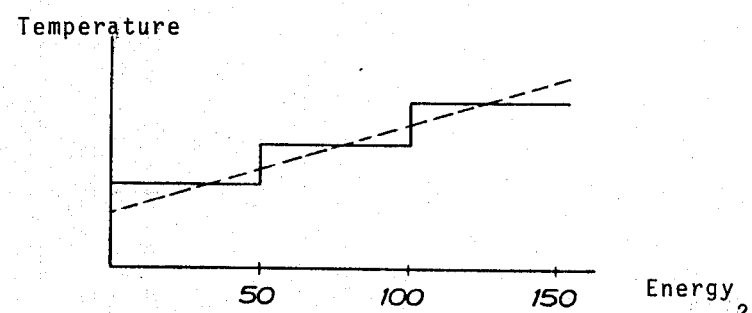
Figure 3:
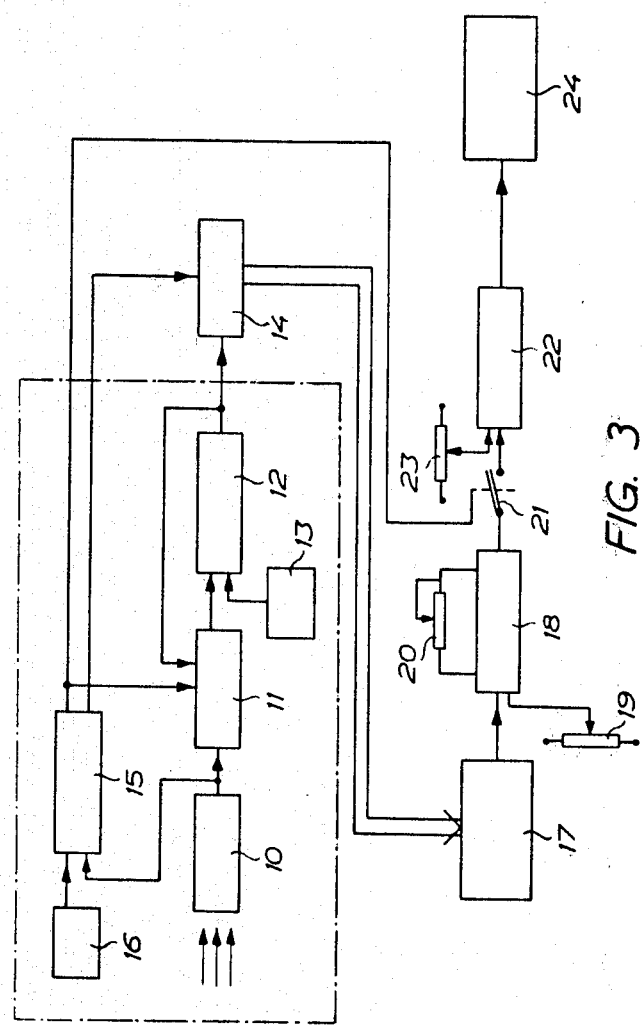
Figure 5:
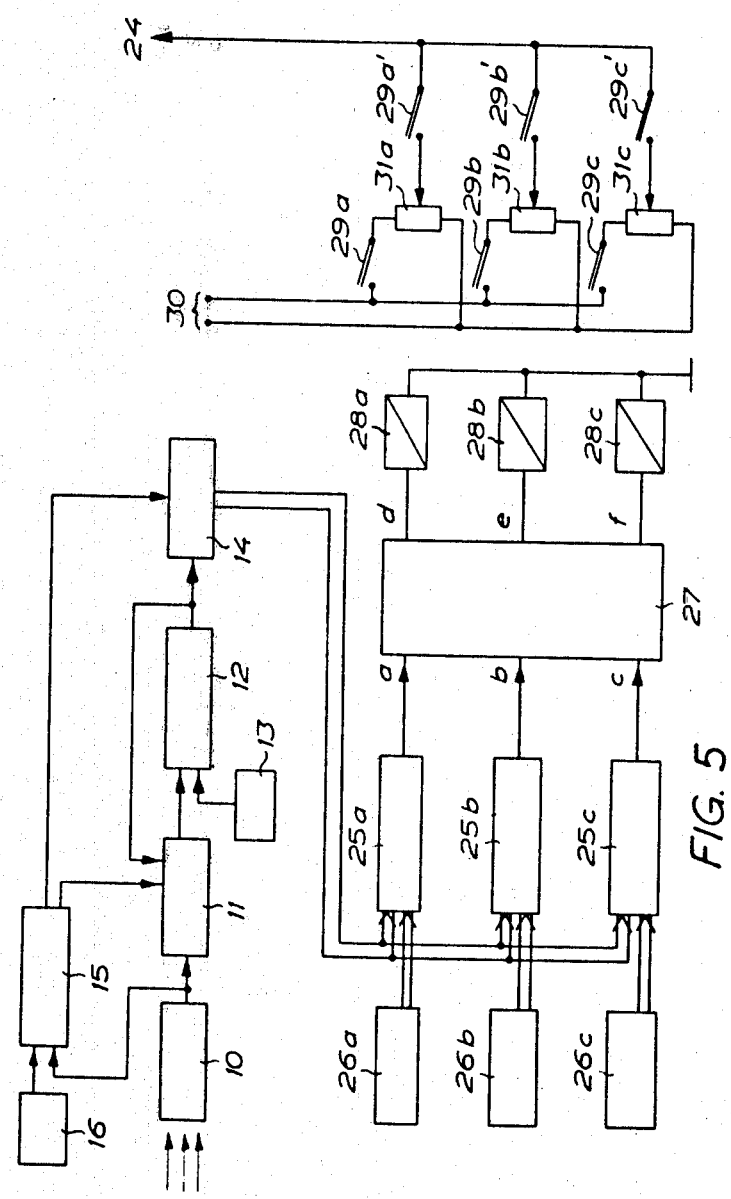

In order to illustrate the invention some embodiments thereof as presently preferred will be described in more detail below reference being made to the accompanying drawings in which FIG. 1 is a diagram illustrating the variation of the sunlight intensity over the time, FIG. 2 is a diagram illustrating the adjusted nominal value of the temperature in the greenhouse at different times, FIG. 3 is a block diagram of an embodiment of the apparatus according to the invention, FIG. 4 is a diagram illustrating the relationship of the adjusted nominal value of the night temperature and the incident sunlight energy, and FIG. 5 is a block diagram of another embodiment of the apparatus according to the invention.

In the diagram according to FIG. 1, the intensity of the light inciding into the greenhouse is indicated in lux on the ordinate of the diagram, the time being indicated on the abscissa of the diagram. The light intensity in lux is indirectly related to the sunlight power in cal/cm$^2$/min. In the daytime the light intensity increases successively from a value at or close to zero to reach a maximum at the middle of the day and then decreases again to a value at or close to zero, said latter value then being maintained in the night. The area defined below the graph in FIG. 1 represents the total sunlight energy supplied in cal/cm$^2$. In controlling the nominal value of the temperature one has not so far taken into account the sunlight energy quantity supplied to the plants in the daytime. The control apparatus of the greenhouse heating unit has been set on a predetermined temperature for the daytime, the temperature then being set on a predetermined lower nominal value in the night for economical reasons. This is illustrated in FIG. 2 which indicates the nominal value of the temperature in the greenhouse on the ordinate of the diagram, the time being indicated on the abscissa of the diagram. The solid line indicates the temperature variation according to the conventional control method, the switch-over from the higher daytime temperature to the lower night temperature, and vice versa, being effected in dependence of a timer.

The invention is based on the knowledge that the incident sunlight energy quantity must be taken into account when determining the night temperature, such that a higher nominal value of the night temperature in the greenhouse is related to a larger sunlight energy quantity as indicated by a dashed line in FIG. 2, in order to avoid that the plants are exposed to a shock effect at the change-over from daytime temperature to night temperature.

A preferred embodiment for providing this control of the nominal value of the night temperature in such a manner that the night temperature is increased proportionally to the sunlight energy quantity is shown in FIG. 3.

The apparatus according to FIG. 3 comprises a photocell 10 which senses the intensity of the sunlight inciding into the greenhouse, and supplies an electric signal to an integrator 11, said signal being proportional to the light intensity. This integrator provides a signal integrated over the time, which represents the sunlight energy quantity inciding into the greenhouse for a predetermined period, said signal being supplied to a comparator 12. The sunlight energy quantity may also be measured indirectly by sensing a quantity which is dependent on the sunlight energy quantity. In addition to the signal from the integrator 11, also a reference signal is supplied to the comparator 12 from a voltage source 13, e.g. a potentiometer. Whenever the signal from the integrator 11 to the comparator 12 reaches the value of the reference signal from the reference voltage source 13 the comparator 12 supplies a pulse to a counter 14 and also to the integrator 11, the counter being counted up one step and the integrator being set to zero to integrate again the signal from the photocell 10 from zero to the maximum value determined by the reference voltage source 13. Thus, the counter 14 will receive pulses from the comparator 12, which as far as the pulse rate is concerned represent the intensity of the inciding sun radiation as measured by the photocell 10, and as far as the number of pulses over a predetermined period is concerned represent the sunlight energy quantity inciding into the greenhouse during that period.

The signal from the photocell 10 is supplied also to a comparator 15 in order that the signal from the photocell in this comparator shall be compared with a reference signal obtained from a reference voltage source 16, e.g. a potentiometer. The reference signal from the voltage source 16 then corresponds to a predetermined sunlight intensity, e.g. at the level which is indicated by a dashed horizontal line in FIG. 1, and when the signal from the photocell 10 increases from a value at or close to zero due to increasing sunlight intensity and passes the value of the reference signal from 16, i.e. at point D in FIG. 1, the comparator 15 will supply a signal to the counter 14 in order to set this counter to zero. When the signal from the photocell 10 is below the level of the sunlight intensity indicated by the dashed line in FIG. 1 and determined by the reference signal from the voltage source 16, the comparator 15 supplies a signal to the integrator 11 in order to maintain this at zero in the night. At points D and N in FIG. 1, representing the change-over from night to day and from day to night, respectively, the integrator 11 thus will be activated and set to zero, respectively.

The signal from the counter 14 is supplied to a digital-/analog converter 17 which converts the number of pulses counted by the counter, to a DC voltage which is supplied to an amplifier 18. From a potentiometer 19 or another voltage source a bias is obtained for the amplifier 18, said bias determining the output voltage from the amplifier at zero signal, and from a potentiometer 20 a bias is obtained for the amplifier 18 by negative feedback, said bias determining the slope of the characteristic of the amplifier, the slope being negative such that a higher input signal is related to a relatively lower output signal. The input signal for the amplifier 18 represents the sunlight energy quantity in cal/cm$^2$ inciding into the greenhouse for a predetermined period, while the output signal from this amplifier represents the number of degrees by which the temperature has to be decreased at the change-over from daytime temperature to night temperature. A higher sunlight energy quantity corresponds to a lower number of degrees. Said period is determined by the photocell 10 in combination with the comparator 15 and the reference voltage source 16 thereof, the counter 14 being set to zero and beginning a further count up at point D in FIG. 1. The count up in the counter 14 is interrupted at point N in FIG. 1, the integrator 11 being set to zero at that point. The value of the incident sunlight energy quantity counted up in the counter 14 (=the number of counted pulses from the comparator 12) thus will be retained in the counter 14 until the counter is set again to zero after the night at point D.

The output signal from the amplifier 18 accordingly will represent a higher or lower temperature value in dependence of the quantity of sunlight energy that has incided into the greenhouse in the day. As the integrator 11 is set to zero by the signal from the comparator 15 at the point N in FIG. 1, the output signal from the comparator is utilized to operate directly or indirectly a switch 21 from opened to closed position. As a consequence thereof the output signal from the amplifier 18 is supplied to a subtractor 22 to which a further input signal is supplied from a potentiometer 23 or another voltage source, said further input signal representing the higher nominal value of the temperature in the greenhouse to be applied in daytime. This value can be adjusted by means of the potentiometer 23. When the switch 21 is opened in daytime the signal from the subtractor 22 will equal (or be directly proportional to) the signal from the potentiometer 23, because under that condition this signal will not be reduced by a signal from the amplifier 18. The output signal from the subtractor 22 controls a regulator 24 of the greenhouse heating unit, and when this regulator is controlled by the signal 23 only, the heating unit will accordingly be adjusted to maintain the preset daytime temperature in the greenhouse.

However, when the switch 21 is closed the signal from the potentiometer 23 will be reduced in the subtractor 22 by an amount corresponding to the difference between the preset nominal value of the daytime temperature in the greenhouse and the nominal value of the night temperature that should be chosen considering the sunlight energy quantity occurring in the daytime. The higher the sunlight energy quantity, the lower the reduction of the signal from the potentiometer 23 in the subtractor 22, i.e. the higher the night temperature that is adjusted on the heat unit regulator 24.

This is illustrated in the diagram according to FIG. 4 wherein the ordinate indicates the nominal value of the night temperature (the output signal) from the subtractor 22) and the abscissa indicates the value of incident sunlight energy (the output signal from the amplifier 18). The diagram indicates the relationship between the nominal value of the night temperature and the value of the incident sunlight energy when the nominal value of the night temperature is controlled by means of the apparatus in FIG. 3. The effect of the digital/analog converter is that the adjustment will be made in small steps; a D/A conversion including 2 bits provides 4 steps, the adjustment following the solid line graph, and a conversion including 8 bits provides 256 steps, the adjustment following approximately the dashed graph. Actually, also in this case the control takes place stepwise but in small steps of 0.01–0.05° C. Still smaller steps can be obtained if the D/A conversion includes further bits.

When the integrator 11 is activated at point D, the switch 21 will simultaneously be opened in order to change over to daytime temperature.

In the embodiment according to FIG. 5, units 10–15 are arranged and interrelated in the same manner as in the embodiment according to FIG. 3. The output signal from the comparator 15 actuates the integrator 11 and the counter 14 only; there is no counterpart to the switch 21 in FIG. 5.

The output signal from the counter 14 is supplied to each of three comparators 25a, 25b, and 25c. To each comparator there is also supplied a reference signal from an adjustable reference voltage source 26a, 26b, and 26c, respectively, and each of the comparators provides an output signal when the signal from the counter 14 increases over the reference signal supplied to the related comparator. The reference signals are adjusted to increasing values, such that the reference voltage source 26a has the minimum value and the reference voltage source 26c has the maximum value. The values can correspond to e.g. 0, 50, and 100 cal/cm$^2$.

The output signal from the comparators 25a, 25b, and 25c are supplied to a gate network 27 (logic). This gate network has three inputs, a, b, and c connected one to each of the comparators 25a, 25b, and 25c, and three outputs d, e, and f connected one to each of three relay coils 28a, 28b, and 28c. The gates of the gate network 27 are connected in such a way that when an input signal is supplied to the input a only due to the fact that the signal from the counter 14 exceeds the reference signal from the reference voltage source 26a, said network energizes the relay coil 28a from the output d, when input signals are supplied to the input a as well as the input b due to the fact that the signal from the counter 14 exceeds the reference signal from the reference voltage source 26a as well as the reference signal from the reference voltage source 26b, said network energizes the relay coil 28b only from the output e, and when input signals are supplied to the three of the inputs a, b, and c due to the fact that the input signal from the counter 14 exceeds the reference signals from the three of the reference voltage sources 26a, 26b, and 26c, said network energizes the relay coil 28c only from the output f. The construction of a gate network (logic) having this function is well-known to the man skilled in the art and therefore need not be described in detail.

The relay coils 28a, 28b, and 28c form part of relays having contacts 29a and 29a', 29b and 29b', 29c and 29c'. A voltage source 30 to which the common potentiometer for the adjustment of the nominal value of the night temperature in the greenhouse normally is connected, in this case can be connected to potentiometers 31a, 31b, and 31c over the relay contacts 29a, 29b, and 29c. These potentiometers can be adjusted to different voltages corresponding to three different nominal values of the night temperature, viz. the potentiometer 31a to the occurring minimum night temperature and the potentiometer 31c to the occurring maximum night temperature. The voltages from the three potentiometers can be supplied one at the time to the regulator 24 of the greenhouse heating unit over the other contact in each relay. Thus, depending on the value supplied to the comparators 25a, 25b, and 25c by the counter 14, the relay coils 28a, 28b, and 28c thus will be energized one after the other in dependence of the sunlight energy quantity as measured, to close the associated relay contacts, such that the nominal value of the night temperature will be increased stepwise according to the solid line graph in FIG. 4.

In the embodiment according to FIG. 5 the switch-over between daytime temperature and night temperature takes place in the conventional manner by means of a timer so that a potentiometer indicating the nominal value of the daytime temperature is energized in daytime while one of the potentiometers 31a, 31b, and 31c is energized in the night.

It is of course possible to control the night temperature in more steps than three as far as the apparatus according to FIG. 5 is concerned.

The regulator 24 controls the operation of the greenhouse heating unit such that this unit operated intermittently effects the heating necessary in order that the actual value of the temperature at any time shall as closely as possible agree with the preset nominal value. It is also possible that the regulator controls shutters for ventilation of the greenhouse.

The several electronic units, such as integrators, comparators and counters, have not been described in details as it is considered to be within common knowledge of the man skilled in the art to construct such components by utilizing commercially available electronic products.

The invention is of course not limited to the embodiments described. It can be modified within the scope of the following claims.

We claim:

1. A method of controlling the temperature in greenhouses wherein the nominal value of the temperature is adjusted between a higher daytime temperature and a lower night temperature, comprising the steps of measuring the sunlight intensity inciding into the greenhouse, activating a sunlight energy measuring means when the inciding sunlight intensity exceeds a predetermined level and deactivating the sunlight energy measuring means when the inciding sunlight intensity falls below said predetermined level, measuring the sunlight energy inciding into the greenhouse when the sunlight energy measuring means is activated, connecting an adjusting means to a temperature regulator for a greenhouse heating unit when said sunlight intensity falls below said predetermined level and disconnecting said temperature regulator adjusting means from said temperature regulator when said sunlight intensity exceeds said predetermined level, and causing said adjusting means to adjust said greenhouse heating unit to a higher night temperature when said sunlight energy measuring means measures a higher sunlight energy quantity and to a lower temperature when said sunlight energy measuring means measures a lower sunlight energy quantity.

2. The method as claimed in claim 1, wherein the night temperature is increased in steps in dependence on higher measured sunlight energy.

3. An apparatus for controlling the temperature in greenhouses, the nominal value of the temperature being adjusted between a higher daytime temperature and a lower night temperature, comprising means for measuring the sunlight intensity inciding into the greenhouse, means for measuring the sunlight energy inciding into the greenhouse, adjusting means for adjusting a temperature regulator of a greenhouse heating unit to a higher night temperature when said sunlight energy measuring means measures a higher quantity of sunlight energy and to a lower temperature when said sunlight energy measuring means measures a lower quantity of sunlight energy, control means responsive to said sunlight intensity measuring means and operable to activate and deactivate said sunlight energy measuring means when the inciding sunlight intensity exceeds a predetermined level and falls below said predetermined level, respectively, said control means being operable to disconnect and to connect said adjusting means to said temperature regulator when said sunlight intensity exceeds said predetermined level and falls below said predetermined level, respectively.

4. An apparatus as claimed in claim 3, said adjusting means including means for presetting a signal corresponding to a predetermined nominal value of daytime temperature, and means for decreasing said signal inversely proportionally to the sunlight energy quantity measured.

* * * * *